June 27, 1967 R. W. ANTHONY 3,327,589
BROACHING APPARATUS
Filed July 5, 1966 3 Sheets-Sheet 2
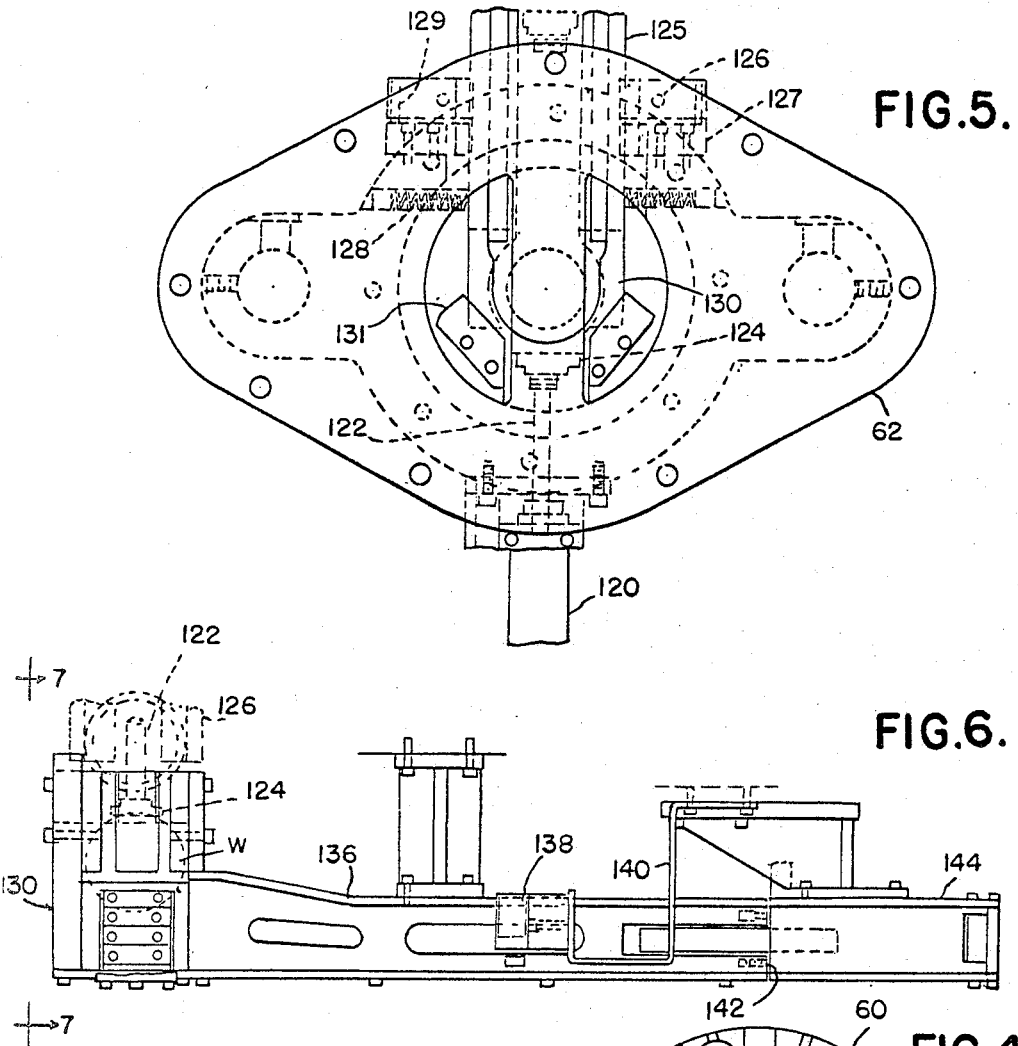
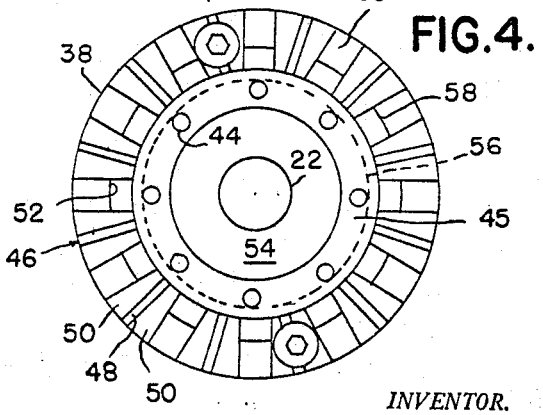
INVENTOR.
RUSSEL W. ANTHONY
BY Whittemore
Hulbert & Belknap
ATTORNEYS June 27, 1967 R. W. ANTHONY 3,327,589
BROACHING APPARATUS Filed July 5, 1966 3 Sheets-Sheet 3

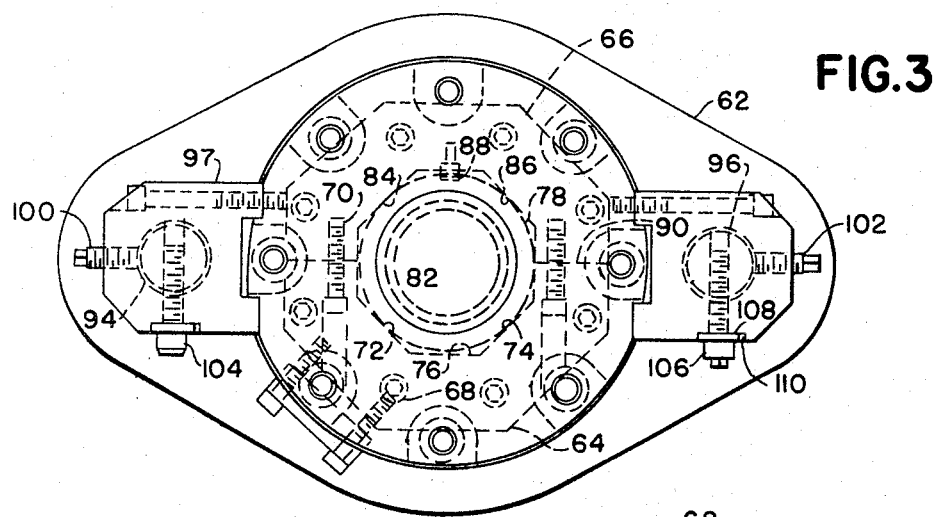
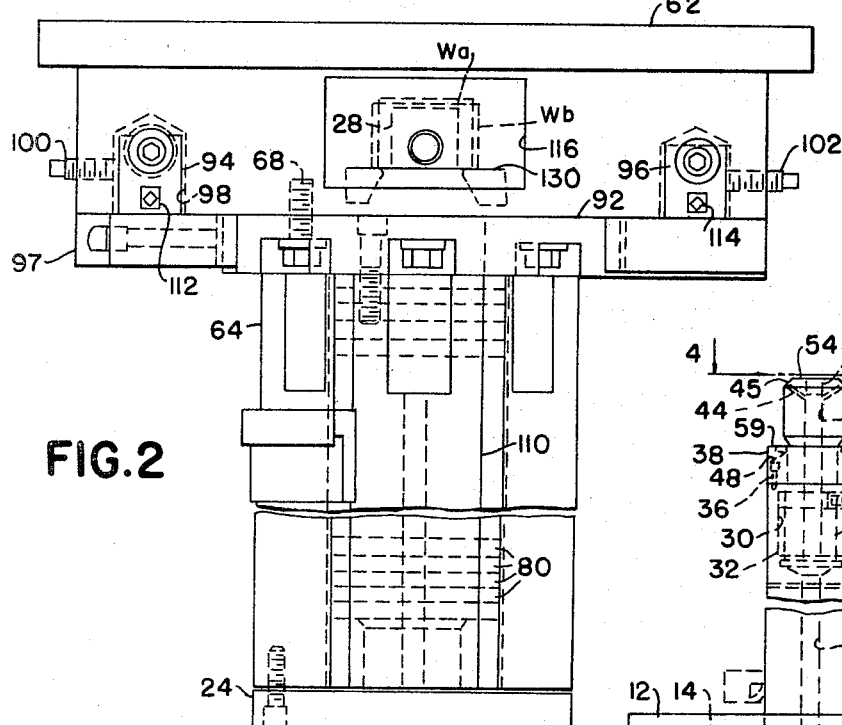
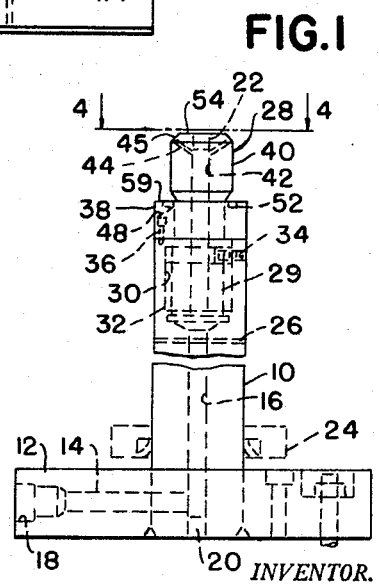

INVENTOR.
RUSSEL W. ANTHONY
BY
ATTORNEYS

United States Patent Office 3,327,589
Patented June 27, 1967

3,327,589
BROACHING APPARATUS
Russel W. Anthony, Detroit, Mich., assignor to National Broach & Machine Company, Detroit, Mich., a corporation of Michigan
Filed July 5, 1966, Ser. No. 562,665
36 Claims. (Cl. 90—71)

This application is a continuation-in-part of my prior copending application, Ser. No. 370,871, filed May 28, 1964.

The present invention relates to broaching apparatus, and more particularly, to broaching apparatus for broaching externally toothed members such as gears, splines, or the like.

It is an object of the present invention to provide broaching apparatus in which the broaching tool assembly comprises a multiplicity of annular wafers provided with internally projecting cutting teeth, and in which the assembly of wafers is clamped together with the tooth portions thereof in accurate alignment in a longitudinally split holder.

It is a further object of the present invention to provide an annular broaching tool assembly comprising a multiplicity of annular discs having internally projecting teeth, an elongated holder comprising two channel parts each shaped to grip the broach wafers at two circumferentially spaced points.

It is a further object of the present invention to provide an annular broaching tool assembly comprising a generally tubular body split longitudinally into two substantially symmetrical halves each provided with a pair of flat broach wafer-engaging surfaces.

It is a further object of the present invention to provide broaching apparatus of the character described comprising an elongated work support, a generally tubular broach assembly open at one end to move over a work piece supported on the elongated work support, said broach assembly having at its opposite end a lateral opening through which a completed work piece may be expelled.

It is a further object of the present invention to provide broaching apparatus comprising a vertical post, a vertical tubular broach assembly open at its lower end to move downwardly over a work piece supported on the top of the post, said broach assembly having a multiplicity of series of stepped teeth and adapted to complete one or more work pieces in a single downward stroke, said broach assembly including supporting means at its upper end provided with a lateral opening through which completed work pieces may be expelled prior to the upward idle return movement of the broach assembly.

It is a further object of the present invention to provide broaching apparatus as described in the preceding paragraph comprising means for ejecting a completed work piece through the lateral opening provided in the broach support means above the operating end of the broach.

Other objects and features of the invention will become aparent as the description proceeds, especially when taken in conjunction with the accompanying drawings, illustrating preferred embodiments of the invention, wherein:

FIGURE 1 is a fragmentary elevational view through the work supporting post.

FIGURE 2 is a fragmentary elevational view through the broach assembly and supporting structure.

FIGURE 3 is a plan view of the broach and broach supporting structure seen in FIGURE 2.

FIGURE 4 is an enlarged elevational view on the line 4—4, FIGURE 1.

FIGURE 5 is a plan view of the broach supporting mechanism including means for ejecting the completed work piece.

FIGURE 6 is a fragmentary plan view of conveyor structure for moving finished gears away from the machine.

FIGURE 7 is a fragmentary end view of the structure shown in FIGURE 6, looking in the direction of the arrow 7—7.

Figure 8:
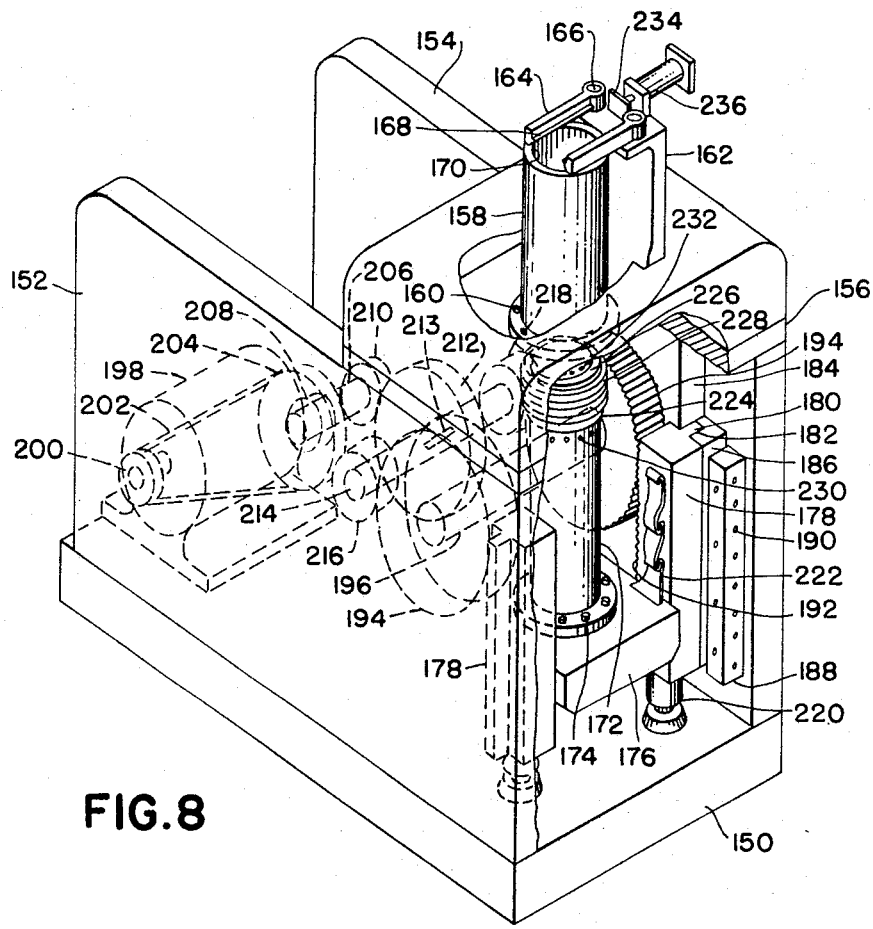
FIGURE 8 is a perspective view showing another embodiment of the invention.

The gear broaching apparatus comprises essentially a vertical work support post or column 10 of heavy construction secured to a supporting base 12. The base 12 and post 10 are provided with communicating coolant passages 14 and 16 respectively, and coolant is supplied to the base through a fitting connection 18. The lower end of the passage 16 is plugged as indicated at 20 and the upper end is plugged as indicated at 22. It will be understood that the post 10 is of substantial height, and the intermediate portion is omitted from FIGURE 1 in the interest of conserving space. In practice, the post 10 may be approximately three feet in length or more, depending upon the length of the broach assembly required to produce a finished gear or gears in a single pass of the broach. In FIGURE 1 the position of the lower end of the broach assembly upon completion of its broaching stroke is indicated at 24.

Adjacent the upper end of the post 10 there are provided a multiplicity of radially extending oil or coolant passages 26 which extend to the outer surface of the post 10.

The means for supporting a work piece at the upper end of the post 10 comprises a removable work locating plug 28 having a reduced stem portion 29 received within an enlarged recess 30 provided at the upper end of the post 10. Intermediate the reduced stem portion 29 and the inner surface of the recess 30 is a wear bushing 32. The work locating plug 28 is retained in the assembled position shown by a screw indicated generally at 34 which engages in an annular groove in the stem portion 29 of the plug.

Secured to the upper end of the post 10 by suitable means, such for example as screws 36, is a work rest ring 38 on the upper surface of which an annular piece is positioned and retained in approximately located position by the enlarged upper portion 40 of the plug 28.

The vertical passage 16 extending through the post 10 communicates with an extension thereof indicated at 42 extending through the plug, and it is the upper end of this extension 42 which receives the closing plug 22 previously described. Below the plug 22 the passage extension 42 communicates with a plurality of oil or coolant passages 44 the outer ends of which open in a beveled annular surface 45 on the work locating plug.

Referring now more particularly to the enlarged plan view of FIGURE 4, it will be observed that the upper end of the work rest ring 38 is provided with a plurality of inclined notches 46, each of the notches including a downwardly inclined straight bottom surface 48 and two laterally inclined side surfaces 50. Thus the notches 46 are of generally V-shaped cross-section. In addition, the remaining horizontal upper surface of the work rest ring 38 is provided with a shallow upwardly open annular groove or channel 52.

The construction just described is perhaps best understood with reference to FIGURE 4 where there is indicated the coolant passage plug 22, an upper flat annular surface 54 of the plug 28, the beveled or conical annular surface 45 thereof, interrupted by the outer ends of the coolant passages 44. In this figure the dotted line 56 represents the radially inner wall of the annular groove or channel 52 and the short arcuate lines 58 represent the radially outer walls of the interrupted channel 52. Accordingly, the upper flat annular surface 59 of ring 38 is intersected by a plurality, herein shown as twelve, inclined grooves or notches 46, and is further interrupted by the upwardly facing annular groove or channel 52. Accordingly, the only flat surfaces available to support the flat side of the work piece are the surfaces 60.

The work supporting plug 28 may have its enlarged upper end 40 splined if the work piece is provided with internal splines, or it may be otherwise shaped to cooperate with the work piece in effecting approximate location of the work piece. However, the work locating plug does not provide the final location of the work piece for coaction with the broach. Instead, the broach includes surfaces designed to maintain guiding contact with the outside diameter of the work piece so as to insure concentricity between the broached teeth thereon with reference to its original outside diameter. Thus, if the work piece has its outside diameter properly qualified with reference to an internal opening, the broaching operation provides teeth in concentric relation to the support surfaces provided in the central opening in the finished work piece.

With the work supporting surface comprised of a plurality, herein illustrated as twelve, annularly arranged flat surfaces, it will be appreciated that when a new work piece is placed over the work locating plug or pilot and is given a partial rotation, any chips which happen to have remained on the flat work supporting surfaces 60 will be moved circumferentially off the flat work supporting surfaces into the inclined grooves or notches, thus insuring that the work piece is positioned perfectly flat on the top of the post.

It may be noted at this time that the broaching machine in operation may be used to cut one or a limited number of work pieces stacked together. In any case, in a single pass it cuts the teeth of a work piece or work pieces to full depth and accordingly, it is a characteristic of the machine that it produces chips very rapidly. The chips collect at the bottom of the post and a housing for chip collection is provided through a side of which oil is continuously flushed to carry the chips away to a magnetic or other type separator.

Referring now to FIGURES 2 and 3 there is illustrated the broach assembly including support structure indicated generally at 62 adapted to be secured to the underside of a ram or slide of a suitable unit such as a hydraulic press. Secured to the underside of the support structure 62 are a pair of elognated broach wafer support members 64 and 66 which are adapted to be clamped to the underside of the support 62 by suitable means such for example as the screws 68, and which are adapted ot be bolted together by a multiplicity of clamping screws 70. Each of the elongated members 64 is provided at its inner surface with two broach wafer-engaging surfaces here designated 72 and 74. Intermediate the surfaces 72 and 74 is a surface 76 preferably positioned to be in clearance with respect to the outer cylindrical surfaces 78 of the broach wafers or rings 80. The elongated member 64 includes additional surfaces 82 which are also positioned to have clearance with respect to the outer surfaces 78 of the broach wafers.

Similarly, the member 66 is provided with two angularly disposed flat surfaces 84 and 86 positioned to engage the cylindrical outer surfaces 78 of the broach wafers. The member 76 is further provided with a locating key 88 which extends into accurate locating grooves or recesses provided in the outer surface of the broach wafers or rings 80. Preferably, the members 64 and 66 are dimensioned so that the abutting edge surfaces thereof, as indicated at 90, have a slight clearance as for example about .001 inch, so that when the clamping screws 70 are tightened there is assurance that each of the broach rings or wafers 80 will be firmly clamped at four 90-degree points by the surfaces 72, 74, 84 and 86.

The multiplicity of broach rings or wafers are in end abutment and the uppermost may be in firm abutment against the underside of a plate 92 connected to the underside of the support 62.

Means are provided for effecting adjustment of the plate 92 angularly and in any direction in a horizontal plane with reference to the support structure 62 and this comprises posts 94 and 96 which extend upwardly from ears 97 bolted or otherwise secured to the plate 92 into recesses 98 provided in the support 62.

The mechanism for effecting adjustment of the structure supported by the plate 92 comprises adjusting screws 100 and 102 which may be respectively loosened and tightened to shift the broach assembly to the right and left as seen in FIGURES 2 and 3. In addition, the support 62 carries adjusting screws 104 and 106 each of which is provided with a flange 108 engageable in an elongated recess 110, the inner end of the screws being threaded in appropriately provided holes in the posts 94 and 96. Associated with the screws 104 and 106 are abutment screws 112 and 114. It will be observed that by proper adjustment of the screws 104, 106, 112 and 114, the broaching structure may be shifted in a horizontal plane at right angles to the direction of adjustment accomplished by the screws 100 and 102. It will also be apparent that angular adjustment may be effected as for example by adjusting the post 94 downwardly, as seen in FIGURE 3, while adjusting the post 96 upwardly as seen in the same figure.

In order to move the elongated tubular broaching structure over a work piece in a broaching stroke, and to provide for removal of the finished work piece before the broaching structure is moved on its return idle stroke, the support 62 is provided with an enlarged opening 116 of a size to permit removal of a finished work piece therethrough. In FIGURE 2 two different size work pieces are indicated in position on the work rest ring 38, these pieces being designated Wa and Wb.

Referring now more particularly to FIGURE 5, the support 62 has attached thereto a long stroke fluid actuated piston and cylinder device including the cylinder 120 which includes a piston rod 122 having a pusher head 124 movable in the plane of a work gear carried at the top of the work rest ring 38. Also bolted to the support 62 is discharge structure including rails 125 which are pivoted as indicated at 126 to brackets 127 bolted or otherwise secured to the support member 62. Compression spring means 128 is provided bearing against the rails 126 and urging them inwardly to a position determined by an adjustable stop screw 129. The inner ends of the rails include camming jaws 130 the undersides of which are inclined inwardly and upwardly so as to cam the jaws outwardly when they engage a finished gear at the top of the post 10. The jaws 130 are guided for lateral movement in guide blocks 131 carried by the support member 62. When the jaws 130 pass beneath the gear the springs 128 urge them inwardly beneath the gear in position to lift the gear off of the plug or pilot 28.

As best seen in FIGURE 2, the jaws 130 are adapted to support the finished work gear in alignment with the discharge opening 116 for discharge therethrough, which occurs upon actuation of the pusher 124 when the broach assembly reaches the top of its return or idle stroke. Since the gear is at this time lifted with the broach, the broach is of course not dragged back through the finished gear.

Structure is provided for conveying finished gears away from the broaching machine and this means comprises the structure best seen in FIGURES 6 and 7. The pusher head 124 advances the finished work gear W into a tilt unit 132, details of which are most apparent in FIGURE 7 where it will be observed that the work gear is moved horizontally beyond a flat supporting surface 133 into engagement with spring means 134 where the work gear is tilted 90 degrees and drops on a toothed edge into an inclined chute 136 where it rolls past a sensing device 138 mounted on bracket structure indicated at 140 and then out the open end 142 of the chute 136 where it drops into a second chute 144.

With the foregoing described structure, the operator is only required to place unfinished work pieces on the work rest ring 38, after which the tubular broaching structure descends in a cutting stroke. The location of the work piece as previously described, is maintained by engagement between the broach structure and the work piece and does not require highly accurate placement of the blank on the work rest ring. As the downward broaching stroke is completed the jaws 130 are cammed outwardly by engagement with the work piece and are returned by springs 128 into supporting position beneath the gear. Thereafter, upon the upward idle stroke, the completed work piece is lifted off the plug or pilot 28 and is supported in alignment with the discharge opening 116 in the support member 62. Upon reaching the top of the idle stroke, the finished work piece is ejected by movement of the pusher 124, is turned through 90 degrees at the tilt unit 132, and thereafter rolls down an inclined chute or chutes to a point of collection.

An essential feature of the present invention is the assembly which comprises the two elongated broach ring support members 64 and 66 each of which is provided with two flat angularly disposed surfaces each of which is engageable with all of the assembled broach wafers at two points. The members 64 and 66 are dimensioned so that when they are clamped together by the multiplicity of assembly screws 70, the confronting edges thereof remain slightly spaced so that clamping pressure on the broach rings or wafers is assured.

With this arrangement the broach rings or wafers are of course individually ground while separated from the elongated support structure and are provided in a set, all of which are of identical outside diameter to a high degree of accuracy so as to insure adequate clamping. Moreover, each is provided with an identical locating groove adapted to receive the key 88 so that the individual broach rings or wafers may be initially ground and subsequently reground, separated from the holder, and thereafter assembled in proper sequence in the holder to produce a highly accurate broach assembly capable of producing correspondingly highly accurate finished gears.

The relationship between the flat clamping surfaces 72, 74, 84 and 86, and the locating key 88 is such as to provide extremely accurate location as well as firm and positive clamping of the broach wafers. When the elongated members 64 and 66 are assembled together by the clamping screws 70 the longitudinally extending opening provided centrally of the assembly for the reception of the broach wafers is generally octagonal in shape and the surfaces 72, 74, 84 and 86 are provided to engage the cylindrical peripheral surface of the broach wafers at substantially 90–degrees intervals. Moreover, intermediate each of the four clamping surfaces referred to, there are provided additional surfaces in clearance with respect to the broach wafers, these being the surfaces 76 and 82 and the surface in which the locating key 88 is provided. The locating key 88 is disposed substantially intermediate the clamping surfaces 84 and 86. The locating surfaces 72, 74, 84 and 86, being flat surfaces, can be accurately ground. Moreover, since these surfaces extend at substantially 45-degree angles to the direction which the surfaces move relative to the cylindrical stack of broach wafers, the wafers are brought into and maintained in true cylindrical registration as well as angular location with reference to the key 88 by the tightening of the clamping screws 70 as aforesaid.

If the work piece is in the form of a spur gear it will remain stationary as the broach assembly moves downwardly over it and forms teeth thereon. However, the present apparatus is also capable of producing helical gears by simply arranging the internal cutting teeth in the broach assembly in helically extending alignment.

With this arrangement the work blank is rotated solely as a result of its engagement with the broach so that the broach in cutting the helical teeth on the work gear will cause it to rotate about its axis.

Referring now to FIGURE 8 there is shown another embodiment of the invention in which the work is pushed upwardly through a stationary broach.

In this case the machine comprises a base 150 having side plates 152 and 154 which are connected across the top by a plate 156 to which the tubular internally toothed broach assembly 158 is rigidly attached as by screws or bolts 160. It will of course be understood that the plate 156 is apertured to permit passage of work pieces or blanks therethrough. The broach 158 is shown diagrammatically and may be substantially identical to the broach assembly described in detail in connection with the first embodiment of the invention.

Also mounted on the plate 156 is a support 162 which carries a pair of jaws 164 each of which is pivoted about pivot mounting means 166. The jaws 164 have work supporting ledges 168 and camming under-surfaces 170 which are engaged by a gear as it is moved upwardly upon completion of a stroke, camming the jaws apart and leaving the finished work piece or work pieces supported on the ledges 168 when the work support returns to starting position.

A vertically movable ram assembly is provided comprising an elongated vertically extending work support post or pedestal 172 which is rigidly attached as by screws 174 to a base plate 176. The base plate 176 is connected at opposite sides to actuating and guiding means. For purposes of clarity the structure at the right hand side of the base plate 176 is shown in detail and parts of the actuating and guiding structure at the opposite side are omitted. The base plate 176 is rigidly connected to vertically elongated guide bars 178 having tenons 180 received in ways 182 defined between a stationary surface 184 provided on the plate 152 or on a bar secured to the plate, and an adjustable bar 186. Rigidly secured to the inner surface of the plate 152 is an adjustment bar 188 having a plurality of adjustable abutment screws 190 which may be adjusted to move the adjustable bar 186 into proper guiding relationship to the tenon 180.

It will be understood that the construction just described in detail is duplicated at the opposite side of the machine where all parts except the vertically extending guide bar are omitted in the drawing.

Each of the guide bars 178 is provided along the inner edge thereof with rack teeth 192 which mesh with pinions or gears 194 fixed to a cross shaft 196, thereby assuring smooth controlled movement of the base plate 176.

The mechanism for effecting vertical movement of the base plate 176 and the post or pedestal 172 attached thereto comprises a motor 198 having a drive shaft 200 connected by belting 202 to a sheave 204 mounted for rotation on a shaft 206 and adapted to be coupled thereto in driving relation by a clutch diagrammatically indicated at 208 which may be solenoid actuated as will presently be described. Clutches suitable for this purpose are standard articles of commerce and the illustration of the clutch here is diagrammatic only.

The shaft 206 carries a pinion 210 driving a gear 212 keyed or otherwise secured as indicated at 213 to a cross shaft 214 carrying a pair of drive pinions 216 and 218 which mesh with the gears 194 in mesh with the rack teeth 192 on the guide bars 178.

A second motor (not shown) is also connected to the shaft 206 through remotely operable clutch means similar to the clutch 208. The use of two separate motors for effecting the vertically upward cutting stroke and the vertically downward return stroke permit the use of an AC motor 198 which need not be reversed since it is selectively coupled and uncoupled with the drive mechanism through the clutch 208. The use of two motors for this purpose permits the use of a relatively large motor, as for example 150 horsepower, for effecting the vertically upward cutting stroke of the work pedestal 172 while the return idle stroke to run the ram back down may be much smaller as for example a 5 horsepower motor.

The downward stroke is terminated by engagement between the guide bars 178 and spring capsules 220 which constitute bumpers and are yieldable to decelerate the ram at the end of its down stroke.

In order to protect the drive gearing including the rack teeth 192 and the gears or pinions 194, suitable collapsible chip shields as indicated at 222 are provided.

The work support pedestal comprises at its upper end an annular or circular support 224 rigidly affixed to the upper end of the pedestal 172 and the support 224 is provided with a pilot 226 shaped to fit loosely into a plurality of annular gears or work blanks 228. The pedestal 172 is provided with a multiplicity of discharge ports 230 connected to oil lines and similarly, the upper surface of the pilot 226 is provided with a multiplicity of upwardly and laterally outwardly directed oil outlet openings 232.

The operation is believed apparent from the foregoing but will be briefly reviewed. The parts in the position illustrated in FIGURE 8 correspond to the end of a stroke and the ram assembly including the base plate 176 and the guide bars 178 is supported on the bumpers 220. It will be observed that the broach support comprising the base 150, the side plates 152, 154, and the transversely extending top plate 156 define a lateral opening through which the work blanks may be moved by hand and placed on the support 224 in approximately located position by the pilot 226. The motor 198 is operated continuously in one direction and at this time the clutch 208 is engaged to effect vertically upward movement of the ram including the work support pedestal 172 and the work support 224. This upward movement is accomplished at uniform controlled speed as for example 20 feet per minute, and is continued until the finished work pieces emerge from the upper end of the stationary broach 158 and engage the jaws 164. Engagement with the camming surfaces 170 of the jaws causes the jaws to swing outwardly and then swing inwardly below the lowermost gear. At this time the clutch 208 is de-energized to disengage the sheave 204 from the shaft 206 and the return motor (not shown) is energized, thus reversely driving the gears or pinions 194 and moving the ram assembly downwardly. This arrangement of course leaves the gears supported on the jaws 164 from which they may be expelled by a pusher 234 connected to a piston within a fluid pressure operated cylinder 236.

The drawings and the foregoing specification constitute a description of the improved broaching apparatus in such full, clear, concise and exact terms as to enable any person skilled in the art to practice the invention, the scope of which is indicated by the appended claims.

What I claim as my invention is:

1. Broaching apparatus comprising an elongated rigid work support member having means at one end for supporting a work piece, an elongated tubular broach member, means for relatively moving said members longitudinally to cause said broach member to broach a work piece on said work support member, broach support means having a lateral opening therein dimensioned to provide for placement or removal of a blank or broached work piece therethrough.

2. Apparatus as defined in claim 1 comprising work gripping means mounted in fixed position relative to said broach support means and engageable with a finished work piece as it is exposed by relative movement between said work piece and said broach member and operable to remove the finished work piece from said work support member and to hold said finished work piece as said broach member passes over said work support member on the return stroke to prevent dragging the finished work piece reversely through said broach member.

3. Apparatus as defined in claim 2 in which said work gripping means comprises a pair of jaws having cam surfaces to separate said jaws engageable by the finished work piece.

4. Apparatus as defined in claim 1 in which the work support member is a fixed vertical post, the broach member is open at both ends and is movable from a starting position above the post to a finishing position in which the upper end of the broach is below a work piece on said post, said broach support means being fixed to the upper end of said broach and having a chamber therein located above the upper end of said broach, said chamber having said lateral opening therein for removal of a finished work piece therethrough.

5. Apparatus as defined in claim 4 which comprises a pusher member movable transversely of said chamber to eject a finished work piece through said opening.

6. Apparatus as defined in claim 5 in which said work piece is an external gear, and which comprises means for turning the finished gear through 90 degrees and positioning it in an inclined chute on its edge so that it may roll along said chute.

7. Apparatus as defined in claim 4 comprising a centering pilot on said post.

8. Apparatus as defined in claim 4 comprising work carrying members on said broach support means engageable with a finished work piece during completion of the broaching stroke operable to lift the finished work piece on the return stroke to prevent movement of the broach rearwardly over a finished work piece.

9. Apparatus as defined in claim 8 in which said broach support means and work carrying members are constructed and arranged to provide for lateral movement of the finished work piece away from said broach support means.

10. Apparatus as defined in claim 9 comprising a work transfer member engageable with a finished work piece at the completion of the idle stroke of said broach assembly to move said work piece away from said broach assembly.

11. Broaching apparatus comprising an elongated rigid vertical work support having a free upper end, means at the free end for mounting a work piece thereon, a broach assembly comprising a broach support and an elongated vertical tubular broach connected at one end thereto, means for effecting relative movement between said work support and broaching assembly to cause said broach to move relative to a work piece over and beyond the work piece, and work transfer means on said broach support engageable with a finished work piece on completion of the broaching stroke to prevent movement of the broach over said work piece on the return stroke of said broach assembly.

12. Apparatus as defined in claim 11 in which said work support includes a piloting plug receivable in an annular work piece.

13. Apparatus as defined in claim 12 in which said work support is a vertical post.

14. Apparatus as defined in claim 13 in which said work transfer means comprise members movable into work supporting position during completion of a broaching stroke and effective to separate said work piece from said plug during the initial idle stroke.

15. Apparatus as defined in claim 14 in which said work transfer means comprises means for supporting the finished work piece for lateral movement away from said broach assembly.

16. Apparatus as defined in claim 14 in which said work transfer means comprises a pair of rails, and ejector means for moving a finished work piece laterally on said rails away from said broach assembly.

17. Apparatus as defined in claim 16 in which said rails have inclined camming surfaces engageable with means associated with a finished work piece to cam said rails outwardly thereof, and resilient means urging said rails inwardly to move into position beneath the work piece to lift the work piece from said plug on initial upward movement of said broach assembly.

18. Apparatus as defined in claim 1 in which the broach support means is fixed, the work support member comprises a vertical post having means at its upper end for receiving a work piece, and means for moving said work support member upwardly in a broaching stroke through said broach means.

19. Apparatus as defined in claim 18 comprising a pair of jaws at the upper end of said broach means arranged to receive a broached work piece as it emerges from the upper end of said broach means and support the work piece during idle return movement of said broach.

20. Apparatus as defined in claim 18, said work support member having a ram secured thereto comprising gearing for effecting vertical movement thereof, a unidirectional relatively large AC motor, clutch means for connecting said motor to said gearing to drive said ram upwardly in a broaching stroke, a second relatively smaller return motor, and clutch means for connecting it to said gearing to move said ram downwardly in an idle return stroke.

21. Apparatus as defined in claim 20, said work support member having a ram secured thereto comprising a pair of vertical guide rails having rack teeth located generally diametrically opposite each other across said post, and gears fixed to each other and in mesh with said racks.

22. In broaching apparatus of the character described, a work support post, an annular work rest ring at the upper end of said post, the upper surface of said ring being a flat horizontal surface interrupted by a multiplicity of generally radial grooves.

23. Apparatus as defined in claim 22 in which said radial grooves are downwardly and outwardly inclined.

24. A broach assembly comprising a stack of flat annular broach wafers, a pair of elongated channel-shaped members dimensioned when assembled over said stack to engage the peripheries of all of the wafers in the stack, said wafers each having a peripheral recess which when said recesses are aligned, form a continuous locating groove in said stack of wafers, one of said members having a key extending longitudinally of its inner side receivable snugly in said locating groove.

25. A broach assembly as defined in claim 24 in which said elongated members have edge portions which remain in slightly spaced relation when said members are clamped tightly on said stack of wafers.

26. A broach assembly as defined in claim 24 in which said wafers have cylindrical peripheral surfaces, and said elongated members are provided with flat surfaces engageable with the cylindrical surfaces of said wafers.

27. A broach assembly as defined in claim 24 in which said wafers have cylindrical peripheral surfaces, and each of said elongated members are provided with two angularly disposed flat surfaces engageable with the cylindrical surfaces of said wafers.

28. A broach assembly comprising a stack of flat annular broach wafers having cylindrical peripheral surfaces, a pair of elongated members each having a longitudinally extending channel shaped to surround approximately one lateral half of the stack of wafers, said members having means at their edge portions for drawing their edge portions together to clamp the stack of wafers in said channels.

29. A broach assembly as defined in claim 28 in which said channels are dimensioned to engage the wafers in clamping relation before the edge portions of said members abut.

30. A broach assembly as defined in claim 29 in which the channels include flat wafer engaging surfaces.

31. A broach assembly as defined in claim 29 in which each of the channels includes two flat wafer engaging surfaces.

32. A broach assembly as defined in claim 29 in which one of said members has a key extending longitudinally of its channel, and all of said wafers have key-receiving locating recesses in their periphery.

33. A broach assembly as defined in claim 29 in which each of the channels includes two flat wafer engaging surfaces, and in which one of said channels has an elongated key extending longitudinally thereof midway between the two wafer engaging surfaces therein.

34. A holder for a stack of broach wafers having cylindrical peripheral surfaces and toothed inner surfaces, said holder comprising a pair of generally similar elongated members each provided with a longitudinally extending channel having a pair of flat clamping surfaces disposed at an angle to each other of about 90 degrees.

35. A holder as defined in claim 34 in which the surfaces in the channels of said members are located such that when said members are assembled into a generally tubular structure, said surfaces are substantially uniformly spaced around the structure to clamp a stack of wafers at zones spaced at about 90-degree intervals around the periphery thereof.

36. A holder comprising a pair of substantially similarly shaped elongated channel members clamped together to form a tubular structure having an elongated opening whose cross-sectional shape is substantially octagonal and includes four flat surfaces disposed at substantially 90-degrees angular spacing around said holder, one of the remaining four surfaces having an inwardly extending longitudinal locating key carried thereby.

No references cited.

WILLIAM W. DYER, JR., *Primary Examiner.*

G. A. DOST, *Assistant Examiner.*